United States Patent
El Batawi et al.

(10) Patent No.: US 10,763,533 B1
(45) Date of Patent: Sep. 1, 2020

(54) SOLID OXIDE FUEL CELL INTERCONNECT HAVING A MAGNESIUM CONTAINING CORROSION BARRIER LAYER AND METHOD OF MAKING THEREOF

(71) Applicant: BLOOM ENERGY CORPORATION, Sunnyvale, CA (US)

(72) Inventors: Emad El Batawi, Sunnyvale, CA (US); Sanchit Khurana, Sunnyvale, CA (US); Michael Gasda, Mountain View, CA (US); Tad Armstrong, Burlingame, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 174 days.

(21) Appl. No.: 15/841,452

(22) Filed: Dec. 14, 2017

Related U.S. Application Data (60) Provisional application No. 62/478,851, filed on Mar. 30, 2017.

(51) Int. Cl.
 *H01M 8/2465* (2016.01)
 *H01M 8/249* (2016.01)
 *H01M 8/10* (2016.01)

(52) U.S. Cl.
 CPC .......... *H01M 8/2465* (2013.01); *H01M 8/10* (2013.01); *H01M 8/249* (2013.01)

(58) Field of Classification Search
 None
 See application file for complete search history.

(56) References Cited

U.S. PATENT DOCUMENTS

| | | |
|---|---|---|
| 4,135,041 A | 1/1979 | Jung et al. |
| 4,755,429 A | 7/1988 | Nickols et al. |
| 4,913,982 A | 4/1990 | Kotchick et al. |
| 5,162,167 A | 11/1992 | Minh et al. |
| 5,213,910 A | 5/1993 | Yamada |
| 5,215,946 A | 6/1993 | Minh |
| 5,248,712 A | 9/1993 | Takeuchi et al. |
| 5,256,499 A | 10/1993 | Minh et al. |

(Continued)

FOREIGN PATENT DOCUMENTS

| | | |
|---|---|---|
| CN | 102763260 | 10/2012 |
| EP | 0615299 A1 | 9/1994 |

(Continued)

OTHER PUBLICATIONS

Haynes International High-Temperature Alloys, "Haynes (Reg.) 214 (TM) alloy", 1996, pp. 1-19.

(Continued)

*Primary Examiner* — Karie O'Neill Apicella
(74) *Attorney, Agent, or Firm* — The Marbury Law Group PLLC (57) ABSTRACT

An interconnect for a fuel cell stack includes an interconnect body having an air surface having air flow channels and ribs and a fuel surface having fuel flow channels and ribs, an electrically conductive contact layer located on the air surface of the interconnect, the electrically conductive contact layer containing at least one of Co and Mn, and a corrosion barrier layer containing zirconium silicate and magnesium aluminosilicate crystals located over the electrically conductive contact layer.

8 Claims, 4 Drawing Sheets

(56) References Cited

U.S. PATENT DOCUMENTS

| | | | |
|---|---|---|---|
| 5,273,837 | A | 12/1993 | Aiken et al. |
| 5,290,642 | A | 3/1994 | Minh et al. |
| 5,342,705 | A | 8/1994 | Minh et al. |
| 5,368,667 | A | 11/1994 | Minh et al. |
| 5,382,315 | A | 1/1995 | Kumar |
| 5,385,792 | A | 1/1995 | Shiratori et al. |
| 5,453,331 | A | 9/1995 | Bloom et al. |
| 5,494,700 | A | 2/1996 | Anderson et al. |
| 5,501,914 | A | 3/1996 | Satake et al. |
| 5,518,829 | A | 5/1996 | Satake et al. |
| 5,589,017 | A | 12/1996 | Minh |
| 5,641,585 | A | 6/1997 | Lessing et al. |
| 5,733,499 | A | 3/1998 | Takeuchi et al. |
| 5,955,392 | A | 9/1999 | Takeuchi et al. |
| 6,001,761 | A | 12/1999 | Hata et al. |
| 6,361,892 | B1 | 3/2002 | Ruhl et al. |
| 6,492,053 | B1 | 12/2002 | Donelson et al. |
| 6,582,845 | B2 | 6/2003 | Helfinstine et al. |
| 6,589,681 | B1 | 7/2003 | Yamanis |
| 6,638,575 | B1 | 10/2003 | Chen et al. |
| 6,835,488 | B2 | 12/2004 | Sasahara et al. |
| 7,045,237 | B2 | 5/2006 | Sridhar et al. |
| 8,691,470 | B2 | 4/2014 | Kumar et al. |
| 9,583,771 | B2 | 2/2017 | Parihar et al. |
| 2002/0012825 | A1 | 1/2002 | Sasahara et al. |
| 2002/0132156 | A1 | 9/2002 | Ruhl et al. |
| 2003/0170527 | A1 | 9/2003 | Finn et al. |
| 2003/0180602 | A1 | 9/2003 | Finn |
| 2004/0101742 | A1 | 5/2004 | Simpkins et al. |
| 2004/0200187 | A1 | 10/2004 | Warrier et al. |
| 2005/0017055 | A1 | 1/2005 | Kurz et al. |
| 2005/0053819 | A1 | 3/2005 | Paz |
| 2005/0136312 | A1 | 6/2005 | Bourgeois et al. |
| 2005/0227134 | A1 | 10/2005 | Nguyen |
| 2007/0037031 | A1 | 2/2007 | Cassidy et al. |
| 2007/0134532 | A1 | 6/2007 | Jacobson et al. |
| 2007/0231676 | A1 | 10/2007 | Cassidy et al. |
| 2008/0081223 | A1 | 4/2008 | Yasumoto et al. |
| 2008/0193825 | A1 | 8/2008 | Nguyen et al. |
| 2010/0055533 | A1 | 3/2010 | Kebbede et al. |
| 2010/0119917 | A1 | 5/2010 | Kumar et al. |
| 2010/0129693 | A1 | 5/2010 | Nguyen et al. |
| 2010/0159344 | A1 | 6/2010 | Gottmann et al. |
| 2010/0209802 | A1 | 8/2010 | Armstrong et al. |
| 2011/0200909 | A1 | 8/2011 | Parihar et al. |
| 2013/0130146 | A1 | 5/2013 | Batawi et al. |
| 2014/0272249 | A1* | 9/2014 | Lee .................. B05D 5/005 428/63 |
| 2014/0342267 | A1* | 11/2014 | Parihar ............... H01M 8/2425 429/465 |

FOREIGN PATENT DOCUMENTS

| | | |
|---|---|---|
| JP | H06-076842 A | 3/1994 |
| JP | 06-215778 | 8/1994 |
| JP | 09-199143 | 7/1997 |
| JP | 09-223506 | 8/1997 |
| JP | 09-245810 | 9/1997 |
| JP | 09-245811 | 9/1997 |
| JP | 09-277226 | 10/1997 |
| JP | 2000-281438 | 10/2000 |
| JP | 2009-212046 | 9/2009 |
| TW | 201029252 | 8/2010 |
| WO | WO2006/016628 | 2/2006 |

OTHER PUBLICATIONS

Haynes International High-Temperature Alloys, "Haynes (Reg.) 230(TM) alloy", 2004, pp. 1-27.

U.S. Appl. No. 15/409,964, filed Jan. 19, 2017, Bloom Energy Corporation.

International Search Report & Written Opinion, International Application No. PCT/US2007/08224, dated Nov. 26, 2008, 10 pgs.

International Search Report, International Application No. PCT/US2003/04808, dated Aug. 19, 2003, 9pgs.

Supplementary European Search Report, International Application No. PCT/US2003/04808, dated Jun. 2, 2008, 3pgs.

International Search Report & Written Opinion, International Application No. PCT/US2010/027899, dated Oct. 20, 2010, 11pgs.

International Preliminary Report on Patentability, International Application No. PCT/US2010/027899, dated Sep. 20, 2011, 6pgs.

International Search Report and Written Opinion, International Application No. PCT/US2012/065213, dated Mar. 29, 2013.

Rezazadeh et al., "Structure, Phase Formation, and Wetting Behavior of BaO—SiO2—B2O3 based Glass-Ceramics as Sealants for Solid Oxide Fuel Cells," Ionics, Jan. 2014, vol. 20, Issue 1, pp. 55-64.

International Search Report and Written Opinion, International Application No. PCT/US2014/035996, dated Oct. 28, 2014, 11pgs.

Search Report from ROC (Taiwan) Patent Application No. 103115660, completed date Oct. 17, 2017, 1 page.

Taiwanese Office Action dated Oct. 19, 2017 from the Taiwan Intellectual Property Office for Application No. 103115660, 4 pages.

\* cited by examiner

SOLID OXIDE FUEL CELL INTERCONNECT HAVING A MAGNESIUM CONTAINING CORROSION BARRIER LAYER AND METHOD OF MAKING THEREOF

FIELD

The present invention is directed to solid oxide fuel cell (SOFC) systems including corrosion barrier layers configured to reduce manganese diffusion.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

According to various embodiments, an interconnect for a fuel cell stack includes an interconnect body having an air surface having air flow channels and ribs and a fuel surface having fuel flow channels and ribs, an electrically conductive contact layer located on the air surface of the interconnect, the electrically conductive contact layer containing at least one of Co and Mn, and a corrosion barrier layer containing zirconium silicate and magnesium aluminosilicate crystals located over the electrically conductive contact layer.

Further embodiments include a method of forming a diffusion barrier layer, comprising providing an interconnect for a fuel cell stack, wherein the interconnect contains an electrically conductive contact layer located on an air surface of the interconnect, and wherein the electrically conductive contact layer contains at least one of Co and Mn, forming a barrier precursor layer comprising at least 90 wt. % glass over the electrically conductive contact layer; and heating the barrier precursor layer to precipitate crystals in the barrier precursor layer to convert the barrier precursor layer to a glass ceramic corrosion barrier layer. The barrier precursor layer comprises $SiO_2$, $Al_2O_3$, MgO, CaO, and $ZrO_2$.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Without wishing to be bound by a particular theory, the present inventors realized that solid oxide fuel cell electrolyte corrosion and cracking may be reduced or eliminated by reducing or eliminating manganese diffusion from a manganese containing, electrically conductive contact layer on the interconnect into the ceramic electrolyte. Manganese from the manganese containing layer diffuses or leaches into a glass or glass ceramic seal and the manganese (and/or a manganese containing compound, such as a manganese rich silicate) then diffuses into the zirconia based electrolyte and accumulates at the electrolyte grain boundaries, resulting in intergranular corrosion of the electrolyte. Absent a glass seal, manganese from the contact layer located on the interconnect does not attack the zirconia based electrolyte, such as yttria and/or scandia stabilized zirconia. In fact, the SOFC cathode electrode directly on the electrolyte may comprise LSM without attacking the electrolyte. Thus, in an embodiment in which a stack is internally manifolded for fuel, corrosion of the stabilized zirconia electrolyte can be reduced or prevented by isolating the electrolyte from manganese diffusion from the conductive contact layer by depositing a magnesium containing manganese diffusion barrier between the manganese containing contact layer and the glass seal. In another embodiment, the barrier layer may be deposited between the glass seal and the stabilized zirconia electrolyte. Alternatively, barrier layers may be deposited between both the manganese containing barrier layer and the glass seal and between the glass seal and the stabilized zirconia electrolyte. The barrier layer may be used with any manganese and/or cobalt containing metal oxide contact layer on the interconnect, such as a perovskite layer (e.g., lanthanum strontium manganate ("LSM"), lanthanum strontium cobaltite or lanthanum strontium manganate-cobaltite), a spinel layer (e.g., a manganese cobalt oxide spinel, such as a $Mn_xCo_{3-x}O_4$ spinel ("MCO"), where x ranges between 1 and 2) or a mixture of a perovskite and spinel metal oxide (e.g., a mixed LSM and MCO layer).

Figure 1A:
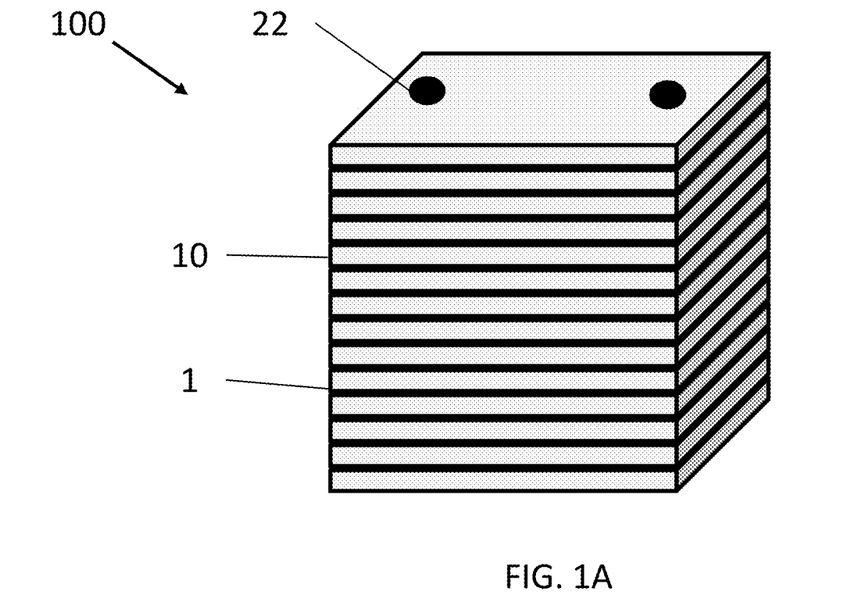
FIG. 1A is a perspective view of a SOFC stack, according to various embodiments of the present disclosure.
Figure 1B:
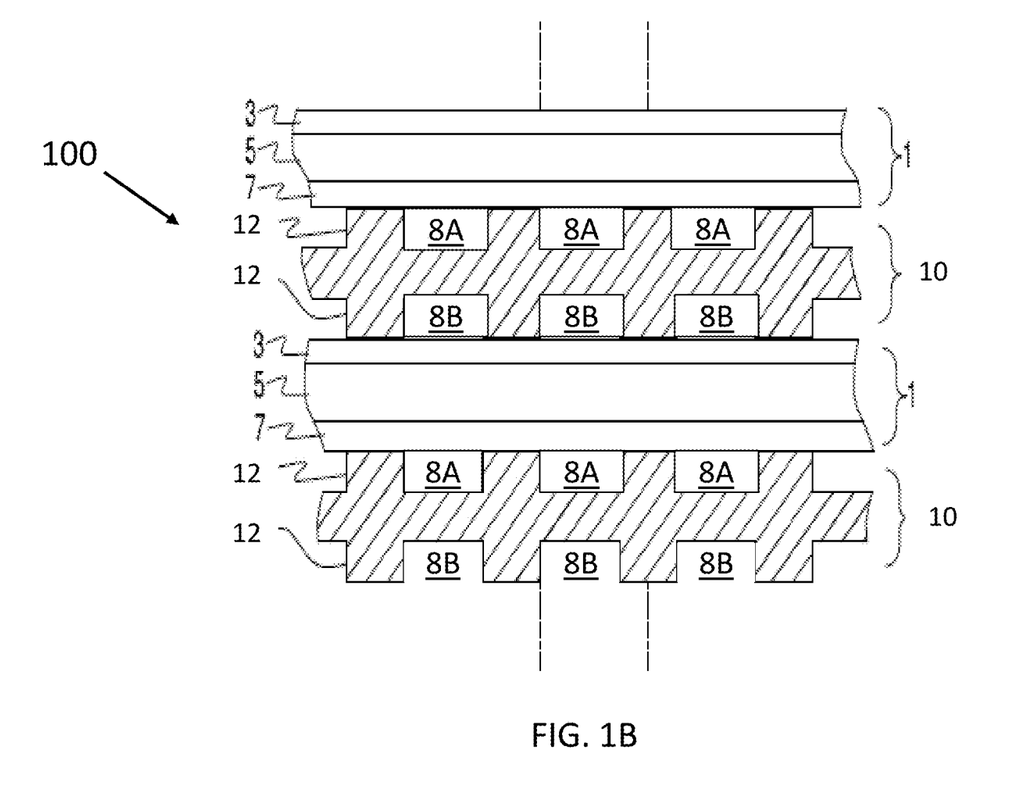
FIG. 1B is a cross-sectional view of a portion of the stack of FIG. 1A.

FIG. 1A is a perspective view of a solid oxide fuel cell (SOFC) stack 100, and FIG. 1B is a sectional view of a portion of the stack 100, according to various embodiments of the present disclosure. Referring to FIGS. 1A and 1B, the stack 100 including fuel cells 1 separated by interconnects 10. Referring to FIG. 1B, each fuel cell 1 comprises a cathode electrode 3, a solid oxide electrolyte 5, and an anode electrode 7.

Various materials may be used for the cathode electrode 3, electrolyte 5, and anode electrode 7. For example, the anode electrode 7 may comprise a cermet comprising a nickel containing phase and a ceramic phase. The nickel containing phase may consist entirely of nickel in a reduced state. This phase may form nickel oxide when it is in an oxidized state. Thus, the anode electrode 7 is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte may comprise a stabilized zirconia, such as scandia stabilized zirconia (SSZ) or yttria stabilized zirconia (YSZ). Alternatively, the electrolyte may comprise another ionically conductive material, such as a doped ceria.

The cathode electrode 3 may comprise an electrically conductive material, such as an electrically conductive perovskite material, such as lanthanum strontium manganite (LSM). Other conductive perovskites, such as LSCo, etc., or metals, such as Pt, may also be used. The cathode electrode 3 may also contain a ceramic phase similar to the anode electrode 7. The electrodes and the electrolyte may each comprise one or more sublayers of one or more of the above described materials.

Fuel cell stacks are frequently built from a multiplicity of SOFC's 1 in the form of planar elements, tubes, or other geometries. Although the fuel cell stack in FIG. 1A is vertically oriented, fuel cell stacks may be oriented horizontally or in any other direction. Fuel and air may be provided to the electrochemically active surface, which can be large. For example, fuel may be provided through fuel conduits (e.g., fuel riser openings) 22 formed in each interconnect 10.

Each interconnect 10 electrically connects adjacent fuel cells 1 in the stack 100. In particular, an interconnect 10 may electrically connect the anode electrode 7 of one fuel cell 1 to the cathode electrode 3 of an adjacent fuel cell 1. FIG. 1B shows that the lower fuel cell 1 is located between two interconnects 10.

Each interconnect 10 includes ribs 12 that at least partially define fuel channels 8A and air channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 100, there may be an air end plate or fuel end plate (not shown) for providing air or fuel, respectively, to the end electrode.

Each interconnect 10 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 10 may comprise a metal (e.g., a chromium-iron alloy, such as 4-6 weight percent iron, optionally 1 or less weight percent yttrium and balance chromium alloy), and may electrically connect the anode or fuel-side of one fuel cell 10 to the cathode or air-side of an adjacent fuel cell 10. An electrically conductive contact layer, such as a nickel contact layer, may be provided between anode electrodes 7 and each interconnect 10. Another optional electrically conductive contact layer may be provided between the cathode electrodes 3 and each interconnect 10.

Figure 2A:
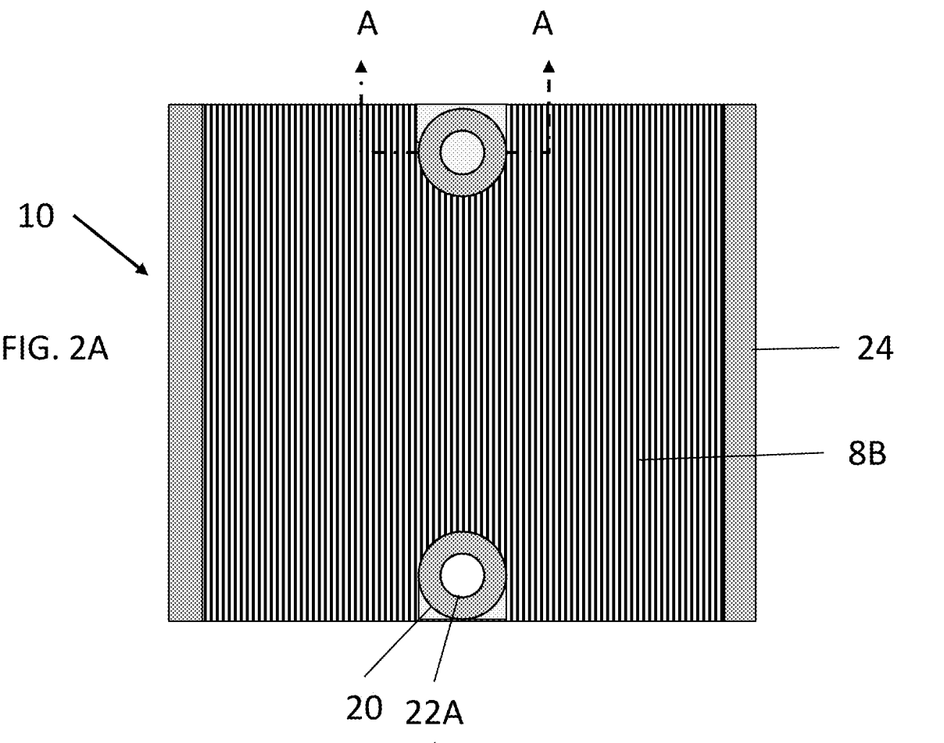
FIG. 2A is a top view of an air side of an interconnect, according to various embodiments of the present disclosure.

FIG. 2A is a top view of the air side of the interconnect 10, and FIG. 2B is a top view of a fuel side of the interconnect 10, according to various embodiments of the present disclosure. Referring to FIGS. 1B and 2A, the air side includes the air channels 8B. Air flows through the air channels 8B to a cathode electrode 3 of an adjacent fuel cell 1. Ring seals 20 may surround fuel holes 22A of the interconnect 10, to prevent fuel from contacting the cathode electrode. Peripheral strip-shaped seals 24 are located on peripheral portions of the air side of the interconnect 10. The seals 20, 24 may be formed of a glass material. The peripheral portions may be an elevated plateau which does not include ribs or channels. The surface of the peripheral regions may be coplanar with tops of the ribs 12.

Figure 2B:
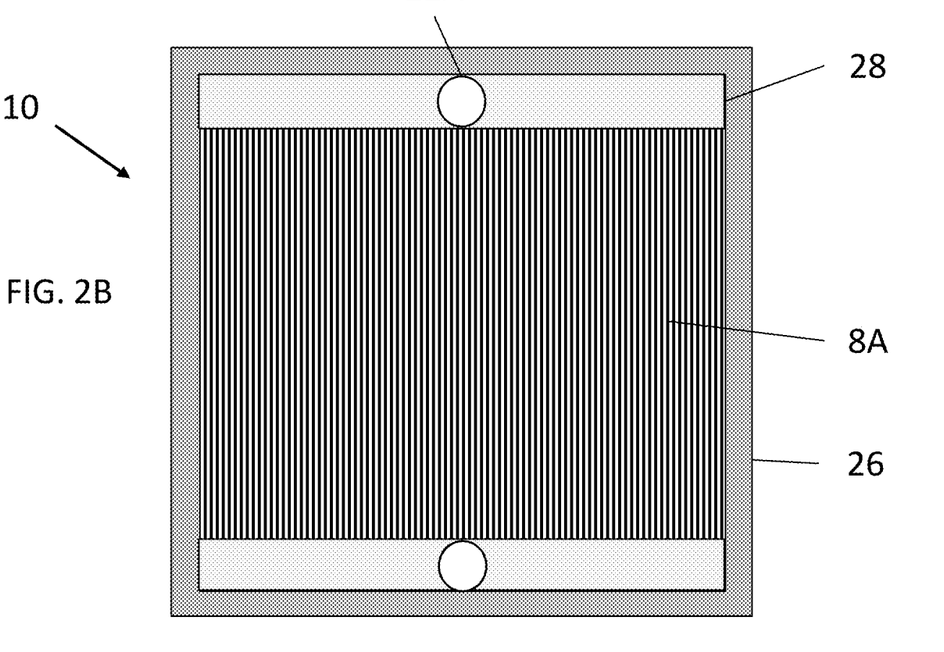
FIG. 2B is a top view of a fuel side of the interconnect of FIG. 2A.

Referring to FIGS. 1B and 2B, the fuel side of the interconnect 10 may include the fuel channels 8A and fuel manifolds 28. Fuel flows from one of the fuel holes 22A, into the adjacent manifold 28, through the fuel channels 8A, and to an anode 7 of an adjacent fuel cell 1. Excess fuel may flow into the other fuel manifold 28 and then into the adjacent fuel hole 22A. A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

The interconnect 10 may be formed of an alloy containing a high amount of chromium (Cr), because such an alloy forms a protective chromia shell at high temperature that prevent spallation. Unfortunately, at these high temperatures, and especially in wet air environments, the chromia layer evaporates Cr, most notably in the form of $CrO_2(OH)_2$. To help prevent this, the air side surface of the interconnect 10 may be coated with a metal oxide contact layer to suppress Cr evaporation from the interconnect 10 and to reduce the growth of oxide scale, as discussed below.

Figure 3:
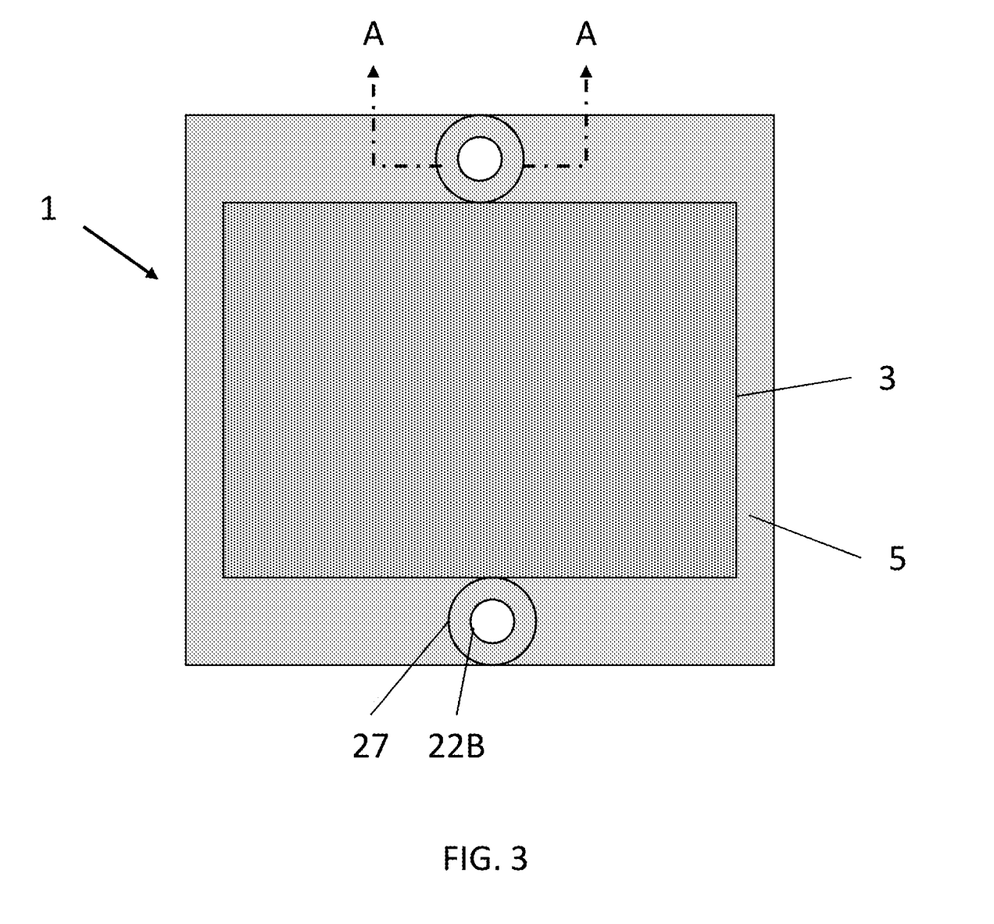
FIG. 3 is a top view of an air side of an SOFC, according to various embodiments of the present disclosure.

FIG. 3 is a top view of an air side of an SOFC 1 included in the stack 100 shown in FIGS. 1A and 1B, according to various embodiments of the present disclosure. Referring to FIGS. 1A, 1B, and 3, the cathode electrode 3 is located in the middle portion of the electrolyte 5. The anode electrode 7 is located on the bottom of the electrolyte and is not shown in FIG. 3.

The SOFC 1 may include fuel holes 22B that extend through the electrolyte 5. The electrolyte 5 may include seal regions 27 disposed around the fuel holes 22B and configured to receive the seals 20. The SOFC's 1 and interconnects 10 may be disposed in the stack 100, such that the fuel holes 22A of the interconnects 10 align with the fuel holes 22B of the SOFC's 1. As such, the fuel holes 22A, 22B may at least partially form the fuel conduits (e.g., fuel risers) 22 of the stack 100.

Figure 4A:
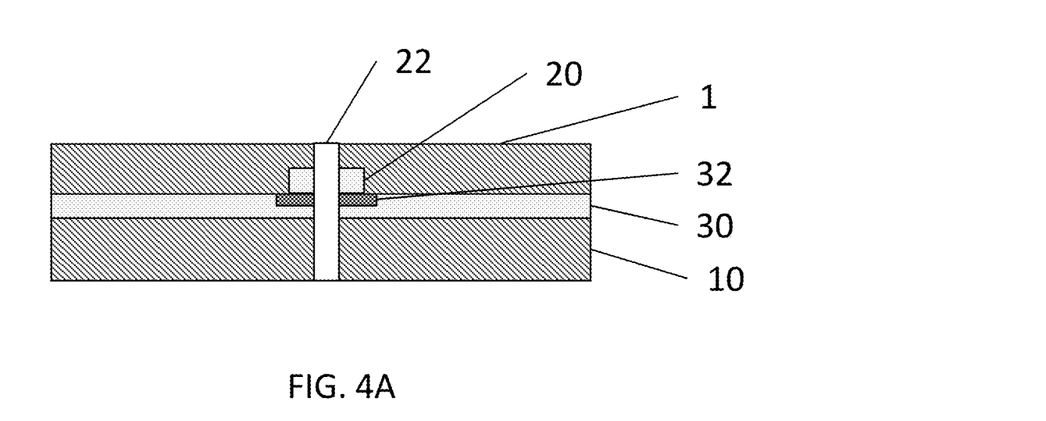
FIG. 4A is a cross-sectional view taken along lines A-A of FIGS. 2A and 3.
Figure 4B:
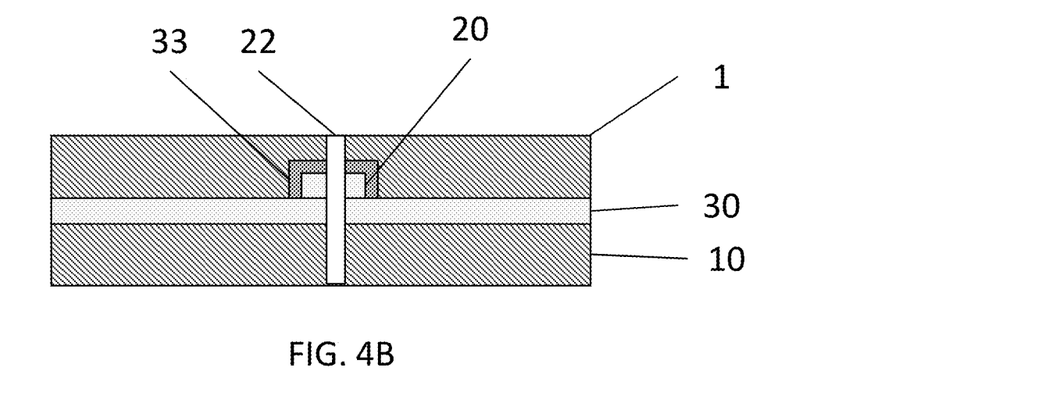
FIGS. 4B and 4C illustrate modified versions of the configuration shown in FIG. 4A.
Figure 4C:
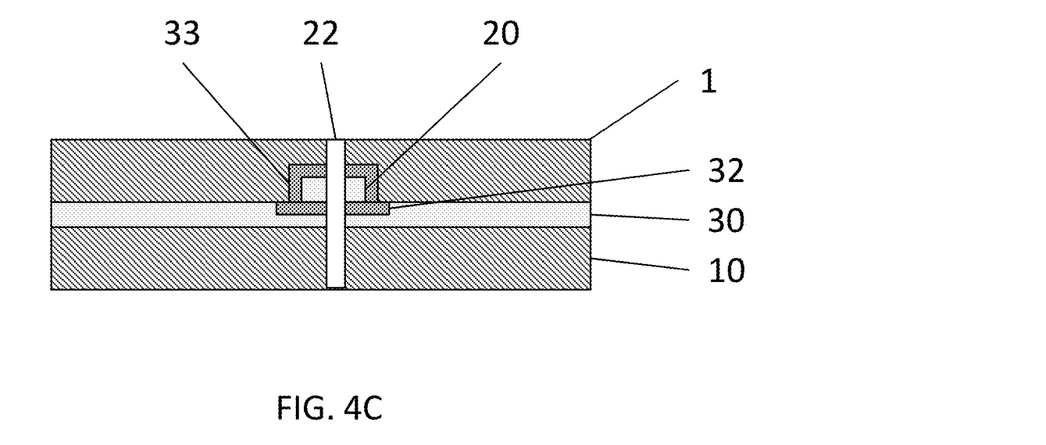

FIG. 4A is a cross-sectional view taken along lines A-A of FIGS. 2A and 3, showing the SOFC 1 and interconnect 10 as disposed in the fuel cell stack 100, according to various embodiments of the present disclosure. FIGS. 4B and 4C illustrate modified versions of the configuration shown in FIG. 4A. The configurations of FIGS. 4B and 4C are similar to the configuration shown in FIG. 4A. As such, only the differences therebetween will be discussed in detail.

Referring to FIG. 4A, a metal oxide contact layer 30 may be formed on an air side of the interconnect 10. The contact layer 30 may include a manganese containing material, such as manganese cobalt spinel (MCO) and/or a strontium-doped lanthanum manganite perovskite (LSM). While such oxide coatings may be very effective in suppressing Cr migration, manganese from the contact layer 30 coatings may diffuse into a glass seal disposed thereon. Without being bound by a particular theory, it is also possible that the fuel (e.g., natural gas, hydrogen and/or carbon monoxide) passing through the fuel conduits 22 may also react with the contact layer 30 and/or the glass seal 20 to create the mobile phase and to enhance manganese and/or cobalt leaching from contact layer 30 into the seal 20.

Accordingly, a corrosion barrier layer (CBL), which may be formed of a glass-ceramic composite material, may be provided to limit diffusion of manganese and/or manganese species into and/or out of glass seals. For example, the CBL may be formed between the contact layer 30 and a glass seal and/or may be formed between a glass seal and a fuel cell. The CBL is preferably not disposed between the cathode electrode of a fuel cell 1 and the contact layer 30 of an adjacent interconnect 10. The CBL is preferably not disposed over the flow channels 8B of an interconnect 10.

For example, as shown in FIG. 4A, a CBL 32 may be disposed between the ring seals 20 and the contact layer 30. In some embodiments, the CBL 32 may be configured to prevent manganese from migrating into glass or glass ceramic seal disposed on the interconnect 10, such as the ring seals 20 and/or the strip-shaped seals 24.

Referring to FIG. 4B, in an alternative embodiment, a CBL 33 is disposed on the ring seals 20. In other words, the CBL 33 is disposed between the ring seals 20 and the fuel cell 1 (e.g., the electrolyte 5 of the fuel cell 1). As such, the CBL 33 is configured to prevent manganese and/or manganese species from migrating out of the ring seals 20 and into the fuel cell 1 (e.g., into the electrolyte 5 of the fuel cell).

Referring to FIG. 4C, in another alternative embodiment, both CBL's 32, 33 may be disposed in the stack 100. Accordingly, the manganese diffusion into the ring seals 20 may be reduced by the CBL 32. In addition, the diffusion of manganese compounds from the ring seals 20 and into the fuel cell 1 may be reduced by the CBL 33.

In various embodiments, a CBL as described above may be formed by depositing a precursor layer onto a contact layer 30 located on the interconnect 10, and then partially crystallizing (e.g., sintering) the precursor layer to form a glass ceramic CBL. The precursor layer may be formed by depositing a powder or a powder and a binder. The powder may be formed substantially of glass. For example, the precursor layer (excluding any binder) may contain at least 90 wt. % glass (e.g., 90-100 wt. % glass, such as around 99 to 100 wt. % amorphous glass and 0 to 1 wt. % crystalline phase).

For example, according to various embodiments, the CBL may be formed from a precursor layer comprising $SiO_2$, $Al_2O_3$, MgO, CaO, and $ZrO_2$ and optionally BaO. In one embodiment, the precursor layer that includes, on an oxide basis: from about 40 to about 60 wt. % $ZrO_2$; from about 30 to about 50 wt. % $SiO_2$; from about 5 to about 15 wt. % $Al_2O_3$; from about 0 to about 5 wt. % BaO, such as from about 2 to about 5 wt. % BaO; from about 2 to about 5 wt. % CaO; and from about 5 to about 15 wt. % MgO.

In various other embodiments, the CBL may be formed from a precursor layer comprising $SiO_2$, $Al_2O_3$, MgO, CaO, and $ZrO_2$ and optionally at least one of BaO, $La_2O_3$, $B_2O_3$ and/or $K_2O$. For example, the precursor layer may include, on an oxide basis, from about 45 wt. % to about 60 wt. % $SiO_2$, such as from about 51 wt. % to about 57 wt. %, or about 54 wt. % $SiO_2$. The precursor layer may include, on an oxide basis, from about 0 wt. % to about 3 wt. % $B_2O_3$, such as from about from about 0.5 wt. % to about 3 wt. % $B_2O_3$, such as about 2 wt. % $B_2O_3$. The precursor layer may include, on an oxide basis, from about 2 wt. % to about 25 wt. % $Al_2O_3$, such as from about 2 wt. % to about 20 wt. %, from about 2 wt. % to about 10 wt. %, or about 2 wt. % $Al_2O_3$. The precursor layer may include, on an oxide basis, from about 0 wt. % to about 10 wt. % $K_2O$, such as from about 5 wt. % to about 10 wt. % $K_2O$, such as from about 5 wt. % to about 8 wt. %, or about 5 wt. % $K_2O$. The precursor layer may include, on an oxide basis, from about 10 wt. % to about 20 wt. % MgO, such as from about 12 wt. % to about 18 wt. %, or about 15 wt. % MgO. The precursor layer may include, on an oxide basis, from about 10 wt. % to about 20 wt. % CaO, such as from about 12 wt. % to about 18 wt. %, or about 15 wt. % CaO. The precursor layer may include, on an oxide basis, from about 0 wt. % to about 5 wt. % BaO, such as from about 0.5 wt. % to about 3 wt. %, or about 1 wt. % BaO.

The precursor layer may include, on an oxide basis, from about 5 wt. % to about 30 wt. % $La_2O_3$ and $ZrO_2$, such as from about 6 wt. % to about 20 wt. %, or about 7 wt. % $La_2O_3$ and $ZrO_2$. With respect to a total amount of $La_2O_3$ and $ZrO_2$ included in the precursor layer, the amount of $La_2O_3$ may range from about 0 wt. % to about 30 wt. %, such as about 1 wt. % to about 20 wt. %, such as about 15%, and the amount of $ZrO_2$ may range from about 70 wt. % to about 100 wt. %, such as about 85 wt. %, on an oxide basis.

For example, the glass powder (or glass powder in a binder) may be applied on the metal oxide contact layer 30 located on the air side of the interconnect in the fuel riser regions adjacent to a fuel inlet and/or fuel outlet opening 22A (e.g., the fuel riser opening). The applied glass powder forms a glass barrier precursor layer over regions on which the ring seal will be provided. If the glass powder barrier precursor layer contains an optional binder, the binder is burned out following the deposition of the precursor layer.

Optionally, the glass powder of the precursor layer may be sintered or densified before the ring seals 20 are formed on the precursor layer and before the interconnect 10 is placed into the stack 100. Alternatively, the precursor layer may be sintered together with the seals 20 after the interconnect 10 is provided into the stack 100.

The ring seal(s) 20 are then formed on the surface of the precursor layer. The glass or glass ceramic ring seal 20 may be applied over the precursor layer in regions adjacent to a fuel inlet and/or fuel outlet (i.e., riser) 22A openings in the interconnect 10.

The interconnect 10 is then placed into a SOFC stack 100 containing the fuel cells 1 and other interconnects 10. In regions of the contact layer 30 that are not covered by the ring seal 20, the glass barrier precursor layer may directly contact the cathode electrode 3 on the electrolyte 5 of an adjacent SOFC 1 in the stack 100.

The SOFC stack is then sintered (i.e., heated at a temperature of at least 900° C., such as 900-950° C.) for 1-10 hours (e.g., 2-5 hours) to melt and set the ring seal(s) 20 and to convert the glass precursor layer(s) to a glass ceramic corrosion barrier layer(s) (i.e., CBL) 32.

The CBL may be in the form of a glass ceramic layer including crystalline phases distributed in a glassy (e.g., amorphous) matrix phase. In some embodiments, without wishing to be bound by a particular theory, it is believed that zirconium silicate ($ZrSiO_4$) crystals and magnesium aluminosilicate crystals, such as barium magnesium aluminosilicate crystals or barium free magnesium aluminosilicate crystals comprise at least a part of the crystalline phase. The atomic composition of the magnesium aluminosilicate crystals may be $((BaO)_{1-x}(MgO)_x)(Al_2O_3)(SiO_2)_2$, where $0 \leq x \leq 0.5$, such as $0.2 \leq x \leq 0.5$ (i.e., to form barium magnesium aluminosilicate crystals). The crystalline phases may comprise 50 to 90 wt. % of the glass ceramic CBL and the amorphous glass phase may comprise the remainder of the glass ceramic CBL composition. The zirconium silicate crystals may comprise 70 to 80 wt. % of the crystalline phase and the magnesium aluminosilicate crystals may comprise 20 to 30 wt. % of the crystalline phase.

In some embodiments, the CBL composition crystalline phases may additionally include calcium silicate crystals, such as calcium magnesium silicate crystals, calcium aluminosilicate crystals and/or magnesium-free and aluminum-free calcium silicate crystals disposed in the glassy matrix phase. The calcium magnesium silicate crystals may have a diopside-like crystal structure and may be represented by the formula $((CaO)_{1-x}(MgO)_x)_2(SiO_2)_2$, where $0.3 \leq x \leq 1.0$. A diopside-like crystal structure is a monoclinic crystal structure which includes, but is not limited to, the exact diopside mineral chemical formula of $Ca_1Mg_1Si_2O_6$. The calcium aluminosilicate crystals or the magnesium and aluminum free calcium silicate crystals may have an anorthite-like crystal structure and may be represented by the formula $((CaO)_{1-x}(Al_2O_3)_x)_2(SiO_2)_2$, where $0 \leq x \leq 0.5$, such as $0.1 \leq x \leq 0.5$. An anorthite-like crystal structure is a triclinic crystal structure which includes, but is not limited to, the exact anorthite mineral chemical formula of $Ca_1Al_2Si_2O_8$.

The SOFC stack 100 operates in temperatures ranging from 750 to 1,000° C. It is believed that after around 2000 hours of operation of the SOFC stack, further filler crystals, such as quartz, diopside, enstatite, or wollastonite crystals, may form (e.g., nucleate and grow) in the CBL. Potassium feldspar ($KAlSi_3O_8$) crystals may be omitted from the CBL and the CBL may be potassium free. Alternatively, the CBL may contain potassium.

The magnesium containing CBL of the present embodiments is believed to significantly improve longer term SOFC stack operating stability and decrease long term intergranular corrosion of the electrolyte compared to a similar barrier layer which lacks magnesium (e.g., which contains barium aluminosilicate rather than barium magnesium aluminosilicate crystals).

Any feature of any embodiment described above can be used in any combination with any one or more features of any one or more embodiments described above. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. An interconnect for a fuel cell stack, comprising:
   an interconnect body having an air surface having air flow channels and ribs and a fuel surface having fuel flow channels and ribs;
   an electrically conductive contact layer located on the air surface of the interconnect, the electrically conductive contact layer containing at least one of Co and Mn; and
   a corrosion barrier layer containing zirconium silicate and magnesium aluminosilicate crystals located over the electrically conductive contact layer;
   wherein the corrosion barrier layer comprises a glass ceramic barrier layer comprising a glassy matrix containing the zirconium silicate and the magnesium aluminosilicate crystals; and
   wherein the glass ceramic barrier layer is formed from a precursor layer that comprises, on an oxide basis:
   from about 45 to about 60 wt. % $SiO_2$;
   from about 10 to about 20 wt. % of MgO
   from about 10 to about 20 wt. % CaO;
   from about 0 to about 10 wt. % $K_2O$;
   from about 5 to about 30 wt. % of at least one of $La_2O_3$ and $ZrO_2$;
   from about 2 to about 25 wt. % $Al_2O_3$;
   from about 0 to about 5 wt. % BaO; and
   from about 0 to about 3 wt. % $B_2O_3$.

2. The interconnect of claim 1, wherein:
   the corrosion barrier layer further comprises at least one of diopside-like and anorthite-like calcium silicate crystals; and
   the precursor layer comprises on an oxide basis and based on a total amount of the at least one of $La_2O_3$ and $ZrO_2$:
   from about 0 to about 30 wt. % of the $La_2O_3$; and
   about 70 to about 100 wt. % of the $ZrO_2$.

3. The interconnect of claim 1, the glass ceramic barrier layer is formed from a precursor layer that comprises, on an oxide basis:
   from about 5 to about 10 wt. % of the $K_2O$;
   from about 5 to about 30 wt. % of the $ZrO_2$; and
   from about 2 to about 5 wt. % of the BaO.

4. An interconnect for a fuel cell stack, comprising:

an interconnect body having an air surface having air flow channels and ribs and a fuel surface having fuel flow channels and ribs;

an electrically conductive contact layer located on the air surface of the interconnect, the electrically conductive contact layer containing at least one of Co and Mn; and a corrosion barrier layer containing zirconium silicate and magnesium aluminosilicate crystals located over the electrically conductive contact layer;

wherein the corrosion barrier layer comprises a glass ceramic barrier layer comprising a glassy matrix containing the zirconium silicate and the magnesium aluminosilicate crystals; and wherein an atomic formula of the magnesium aluminosilicate crystals is $((BaO)_{1-x}(MgO)_x)(Al_2O_3)(SiO_2)_2$, where $0 \leq x \leq 0.5$.

5. An interconnect for a fuel cell stack, comprising:

an interconnect body having an air surface having air flow channels and ribs and a fuel surface having fuel flow channels and ribs;

an electrically conductive contact layer located on the air surface of the interconnect, the electrically conductive contact layer containing at least one of Co and Mn; and a corrosion barrier layer containing zirconium silicate and magnesium aluminosilicate crystals located over the electrically conductive contact layer;

wherein the corrosion barrier layer comprises a glass ceramic barrier layer comprising a glassy matrix containing the zirconium silicate and the magnesium aluminosilicate crystals; and wherein the magnesium aluminosilicate crystals comprise barium magnesium aluminosilicate crystals having an atomic formula $((BaO)_{1-x}(MgO)_x)(Al_2O_3)(SiO_2)_2$, where $0.2 \leq x \leq 0.5$.

6. The interconnect of claim 4, wherein:

the electrically conductive contact layer comprises lanthanum strontium manganite (LSM), manganese cobalt oxide spinel (MCO) or a mixture thereof; and the interconnect comprises a chromium-iron alloy interconnect having gas flow channels and ribs.

7. A solid oxide fuel cell (SOFC) stack, comprising:

a plurality of SOFCs; and a plurality of interconnects of claim 6.

8. The SOFC stack of claim 7, wherein:

the SOFC stack further comprises a glass or glass ceramic seal located between each glass ceramic barrier layer and a cathode electrode of each adjacent SOFC;

the seal comprises a ring seal located over the glass ceramic barrier layer in at least one fuel riser region around a fuel riser opening through the interconnect; and the glass ceramic barrier layer prevents or reduces at least one of Mn and Co diffusion from the electrically conductive contact layer to at least one of the seal and an adjacent SOFC in the SOFC stack.

* * * * *